United States Patent
Mellet et al.

(10) Patent No.: US 9,523,418 B2
(45) Date of Patent: Dec. 20, 2016

(54) SPLIT INPUT CONTINUOUSLY VARIABLE TRANSMISSION

(71) Applicant: GM Global Technology Operations LLC, Detroit, MI (US)

(72) Inventors: Edward W. Mellet, Rochester Hills, MI (US); James M. Hart, Belleville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 110 days.

(21) Appl. No.: 14/262,068

(22) Filed: Apr. 25, 2014

(65) Prior Publication Data

US 2015/0308552 A1 Oct. 29, 2015

(51) Int. Cl.
*F16H 37/08* (2006.01)
*F16H 37/02* (2006.01)

(52) U.S. Cl.
CPC ........ *F16H 37/0846* (2013.01); *F16H 37/022* (2013.01); *F16H 2037/0886* (2013.01); *F16H 2200/2007* (2013.01); *F16H 2200/2035* (2013.01)

(58) Field of Classification Search
None
See application file for complete search history.

(56) References Cited

U.S. PATENT DOCUMENTS

| | | | | |
|---|---|---|---|---|
| 3,492,891 A | * | 2/1970 | Livezey | F16H 47/04 475/24 |
| 5,830,097 A | * | 11/1998 | Larkin | F16H 47/04 475/72 |
| 2013/0130863 A1 | | 5/2013 | Xu et al. | |
| 2013/0281244 A1 | * | 10/2013 | Vaughn | F16H 47/04 475/72 |
| 2014/0038761 A1 | | 2/2014 | Xu | |
| 2015/0167802 A1 | * | 6/2015 | Yoshida | F16H 37/022 475/211 |

FOREIGN PATENT DOCUMENTS

JP WO 2013175582 A1 * 11/2013 ........... F16H 37/022

OTHER PUBLICATIONS

Pending U.S. Appl. No. 14/031,636, filed Sep. 19, 2013 by Edward W. Mellet et al. All Pages.
Pending U.S. Appl. No. 14/466,128, filed Aug. 22, 2014 by Edward W. Mellet et al. All Pages.

* cited by examiner

*Primary Examiner* — Erin D Bishop (57) ABSTRACT

A two mode CVT is provided that for a motor vehicle. The CVT includes a speed change device connected to a pulley and belt assembly. The pulley and belt assembly is connected to a planetary gear set arrangement. The planetary gear set arrangement generally includes two planetary gear sets, two brakes, and one clutch. The planetary gear set arrangement is connected to a final drive unit.

8 Claims, 5 Drawing Sheets

SPLIT INPUT CONTINUOUSLY VARIABLE TRANSMISSION

FIELD

The present disclosure relates to automatic transmissions and more particularly to a split input continuously variable transmission.

BACKGROUND

The statements in this section merely provide background information related to the present disclosure and may or may not constitute prior art.

A continuously variable transmission ("CVT") typically includes a belt and pulley system that operatively couples a rotary power source, such as an engine or electric motor, to a double gear final drive unit. The belt and pulley system generally includes first and second pairs of pulley cones having a torque transmitting belt or chain extending between the cone pairs. Each pulley cone pair includes an axially stationary pulley member and an axially movable pulley member. Each movable pulley member is axially adjustable with respect to the stationary pulley member by a hydraulic system. The hydraulic system provides primary and secondary hydraulic pressures to the respective movable pulley members to adjust the running radius of the first and second pulley cone pairs which in turn controls the output/input ratio of the continuously variable transmission. Movement of the cones steplessly or continuously varies the ratio of an input speed to an output speed. With the continuously variable transmission, small but effective ratio changes can be attained. This is in contrast to a fixed gear ratio unit where any ratio changes are step values.

In many CVT's, engine torque is transferred from the pulley to the belt via friction by clamping the belt between the pulleys. The required clamping force, therefore, is a function of the amount of torque being transferred through the belt where higher levels of engine torque require higher levels of clamping force on the belt to prevent slippage. Yet generally speaking, the higher the clamping force required, the more wear on the belt and the less efficient the system. Accordingly, there is a need for improved CVT designs that reduces the required clamping forces on the belt to improve the efficiency of the CVT.

SUMMARY

A split input or two mode continuously variable transmission is provided for a motor vehicle. The continuously variable transmission includes an input member, an output member, a continuously variable unit connected to the input member, a gearbox connected to the continuously variable unit and to the output member, and a split input clutch connected between the input member and the gearbox for selectively connecting the input member with the gearbox during high gear speeds.

In one example of the present invention, the continuously variable transmission the split input clutch is not engaged during low gear speeds.

In another example of the present invention, a first gear set is coupled to the input member and a second gear set is coupled to the first gear set and to the gearbox.

In another example of the present invention, the split input clutch is disposed between the input member and the first gear set for selectively coupling the first gear set to the input member.

In another example of the present invention, the split input clutch is disposed between the first gear set and the second gear set for selectively coupling the first gear set to the second gear set.

In another example of the present invention, the split input clutch is disposed between the second gear set and the gearbox for selectively coupling the second gear set to the gearbox.

In another example of the present invention, the gearbox includes a first planetary gear set interconnected to a second planetary gear set.

In another example of the present invention, the first planetary gear set includes a first member, a second member, and a third member and the second planetary gear set includes a first member and a second member, wherein the third member of the second planetary gear set is connected to a first brake, the first member of the first planetary gear set is interconnected to the split input clutch for receiving torque therefrom when the split input clutch is engaged and is connected to a second brake, the first member of the second planetary gear set is connected to the continuously variable unit, and the second members of the first and second planetary gear sets are interconnected to the output member.

In another example of the present invention, the first members are sun gears, the second members are planet carrier members, and the third member is a ring gear.

In another example of the present invention, the first planetary gear set includes a first member, a second member, and a third member and the second planetary gear set includes a first member, a second member, and a third member, wherein the third member of the first planetary gear set is connected to a first brake, the third member of the second planetary gear set is interconnected to the split input clutch for receiving torque therefrom when the split input clutch is engaged, the first member of the first planetary gear set and is connected to a second brake, the first member of the second planetary gear set is connected to the continuously variable unit, and the second members of the first and second planetary gear sets are interconnected to the output member.

In another example of the present invention, the first members are sun gears, the second members are planet carrier members, and the third members are ring gears.

In another example of the present invention, the continuously variable unit includes an endless belt disposed between two.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and is not intended to limit the scope of the present disclosure in any way.

DETAILED DESCRIPTION

The following description is merely exemplary in nature and is not intended to limit the present disclosure, application, or uses.

Figure 1:
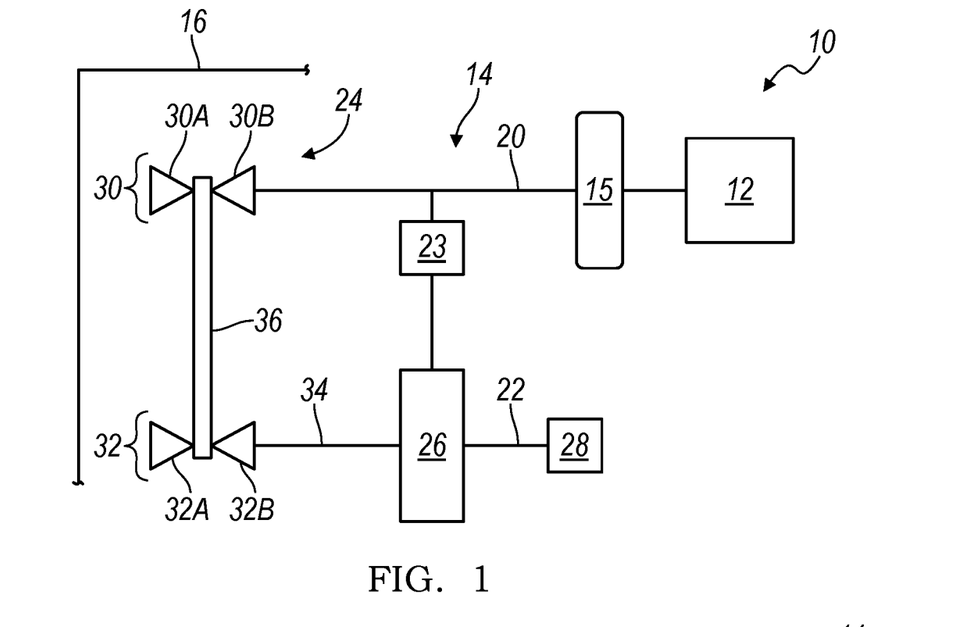
FIG. 1 is a schematic diagram of a powertrain according to the principles of the present invention.

With reference to FIG. 1, a powertrain for a motor vehicle is generally indicated by reference number 10. The powertrain 10 generally includes an engine 12 interconnected with a transmission 14. The engine 12 may be a conventional gasoline, Diesel, or flex fuel internal combustion engine, a hybrid engine, or an electric motor, or any other type of prime mover, without departing from the scope of the present disclosure. The engine 12 supplies a driving torque to the transmission 14 through, for example, a flexplate (not shown) or other connecting device or a starting device 15 such as a hydrodynamic device or launch clutch.

The transmission 14 is a variable diameter pulley or sheave drive continuously variable transmission (CVT). The transmission 14 includes a typically cast, metal housing 16 which encloses and protects the various components of the transmission 14. The housing 16 includes a variety of apertures, passageways, shoulders and flanges which position and support these components. Generally speaking, the transmission 14 includes a transmission input shaft 20 and a transmission output shaft 22. Connected between the transmission input shaft 20 and the transmission output shaft 22 is a torque splitting device 23, a pulley assembly or continuously variable unit 24, and a gearbox or planetary gear assembly 26 that cooperate to provide forward and reverse speed or gear ratios between the transmission input shaft 20 and the transmission output shaft 22. The transmission input shaft 20 is functionally interconnected with the engine 12 through the starting device 15 and receives input torque or power from the engine 12. The transmission output shaft 22 is preferably connected with a final drive unit 28. The transmission output shaft 22 provides drive torque to the final drive unit 28. The final drive 28 unit may include a differential, axle shafts, and road wheels (not shown).

The transmission input shaft 20 is connected to the torque splitting device 23 and to the pulley assembly 24. The torque splitting device 23 is selectively connected to the gearbox 26, as will be described in greater detail below. The torque splitting device 23 selectively splits the input torque from the engine 12 to the gearbox 26, thereby reducing the torque through the pulley assembly 24.

The pulley assembly 24 includes a first pulley or sheave pair 30 and a second pulley or sheave pair 32. The first pulley 30 includes a first truncated conical sheave or member 30A and second truncated conical sheave or member 30B in axial alignment with the first truncated conical sheave 30A. The second sheave 30B is directly connected for rotation with the transmission input shaft 20 and may be integrally formed with the transmission input shaft 20. The first sheave 30A is moveable axially relative to the second sheave 30B by a hydraulic control system (not shown) or other actuating system. It should be appreciated that the sheaves 30A and 30B may be axially switched without departing from the scope of the present invention.

The second pulley 32 includes a first truncated conical sheave or member 32A and second truncated conical sheave or member 32B in axial alignment with the first truncated conical sheave 32A. The second sheave 32B is directly connected for rotation with a second transfer shaft or member 34 or may be integrally formed with the second transfer shaft 34. The first sheave 32A is moveable axially relative to the second sheave 32B by a hydraulic control system (not shown) or other actuating system. It should be appreciated that the sheaves 32A and 32B may be axially switched without departing from the scope of the present invention.

A torque transmitting belt or chain 36 having a V-shaped cross section is mounted between the first pulley pair 30 and the second pulley pair 32. It should be appreciated that other types of belts, including positive engagement devices and non-V-shaped belts, may be employed without departing from the scope of the present invention. Drive torque communicated from the transmission input shaft 20 is transferred via friction between the sheaves 30A and 30B and the belt 36. The ratio of the input pulley 30 to the output pulley 32 is adjusted by varying the spacing between the sheaves 30A and 30B and between the sheaves 32A and 32B. For example, to change the ratio between the pulleys 30 and 32, the axial distance between sheaves 30A and 30B may be reduced by moving sheave 30A towards sheave 32B while simultaneously the axial distance between sheave 32A and 32B may be increased by moving sheave 32A away from sheave 32B. Due to the V-shaped cross section of the belt 36, the belt 36 rides higher on the first pulley 30 and lower on the second pulley 32. Therefore the effective diameters of the pulleys 30 and 32 change, which in turn changes the overall gear ratio between the first pulley 30 and the second pulley 32. Since the radial distance between the pulleys 30 and 32 and the length of the belt 36 is constant, the movement of the sheaves 30A and 32A must occur simultaneously in order to maintain the proper amount of tension on the belt 36 to assure torque is transferred from the pulleys 30, 32 to the belt 36.

The pulley assembly 24 transfers torque to the gearbox 26 via a transfer shaft or member 34. The gearbox 26 comprises one of several planetary gear set transmissions or arrangements, as will be described in greater detail below. The gearbox 26 outputs torque from the pulley assembly 26 and the torque splitting device 23 to the transmission output shaft 22 and then to the final drive unit 28.

Figure 2A:
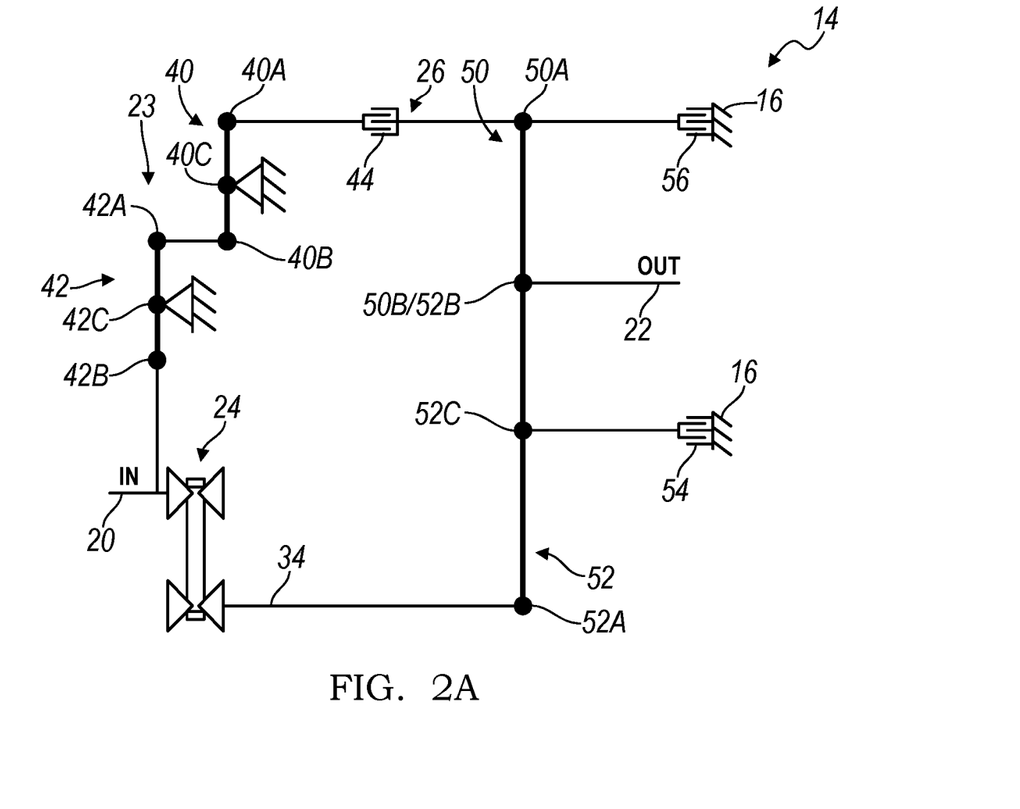
FIG. 2A is a schematic lever diagram of an exemplary transmission according to the principles of the present invention.
Figure 2B:
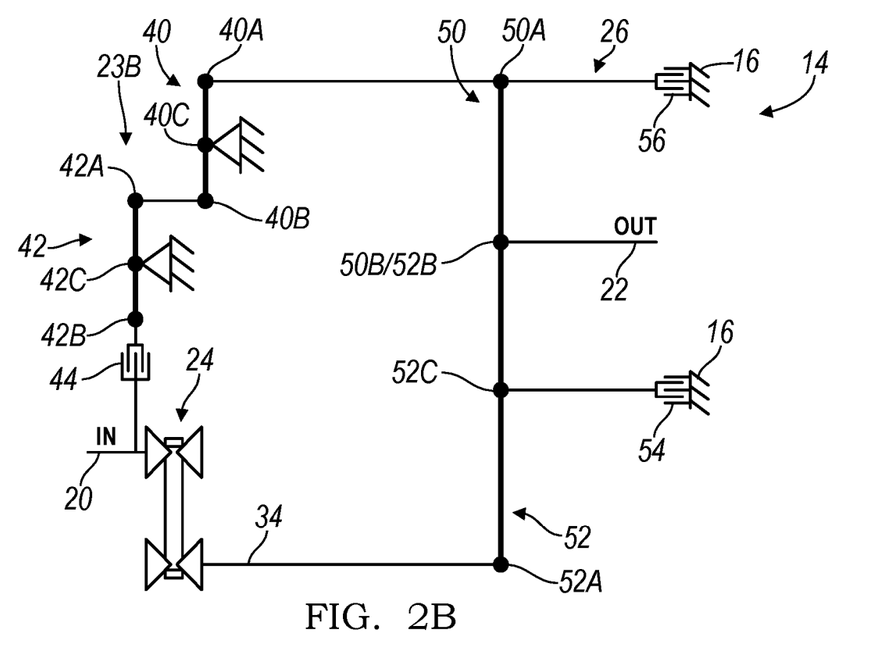
FIG. 2B is a schematic lever diagram of another exemplary transmission according to the principles of the present invention.
Figure 2C:
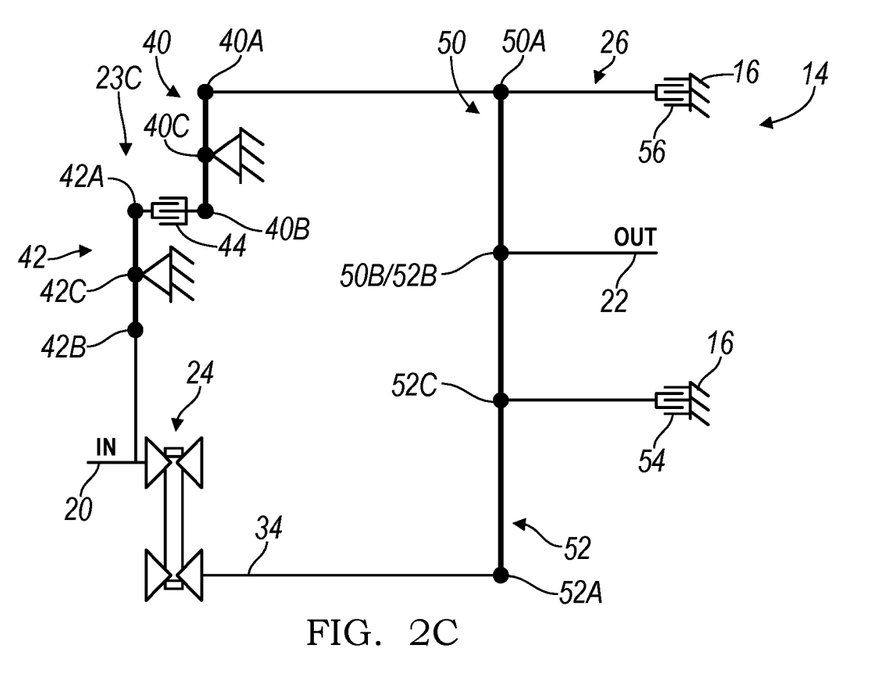
FIG. 2C is a schematic lever diagram of another exemplary transmission according to the principles of the present invention.

Turning now to FIGS. 2A-C, various configurations of the torque splitting device 23 and the gearbox 26 are shown in lever diagram format. A lever diagram is a schematic representation of the components of a mechanical device such as meshing gear sets or planetary gear sets. Each individual lever represents a planetary gear set or meshed gear pair. The three basic mechanical components of the planetary gear are each represented by a node while the gear pairs are represented by a node and the rotation change represented by a node fixed to ground. Therefore, a single lever contains three nodes. In a planetary gear set, one node represents the sun gear, one the planet gear carrier, and one the ring gear. In a meshed gear pair, one node represents a first gear, one a second gear, and the third the rotational direction change between the meshed gears. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

For example, the speed change device 23 includes a first gear 40 and a second gear 42. The first gear 40 is represented by a first node 40A, a second node 40B, and a third node 40C. The second gear 42 is represented by a first node 42A, a second node 42B, and a third node 42C. The first node 40A of the first gear 40 is coupled to a torque transmitting mechanism or split input clutch 44. The split input clutch 44 selectively connects the first node 40A of the first gear 40 to the gearbox 26. The second node 40B of the first gear 40 is coupled to the first node 42A of the second gear 42, thereby representing meshed gears. The third node 40C of the first gear 40 is fixed to ground representing a change in rotational direction of the first gear 40. The second node 42B of the second gear 42 is coupled to the transmission input shaft 20. The third node 42C of the second gear 42 is fixed to ground representing a change in rotational direction of the second gear 42 The gears 40 and 42 may be co-planar or partially axially offset from one another. In another embodiment, the gears 40 and 42 are replaced by a chain connected from the transmission input shaft 20 to the torque transmitting mechanism 44.

The gearbox 26 includes a first planetary gear set 50 and a second planetary gear set 52. The first and second planetary gear sets 50 and 52 are represented by a four node lever diagram. The first planetary gear set 50 has three nodes: a first node 50A, a second node 50B and a third node 50C. The second planetary gear set 52 has three nodes: a first node 52A, a second node 52B and a third node 52C.

The transfer member 34 is continuously coupled to the first node 52A of the second planetary gear set 52. The transmission output member 22 is coupled to the second node 50B of the first planetary gear set 50 and to the second node 52B of the second planetary gear set 52. The split input clutch 44 selectively connects the first node 40A of the first gear 40 to the first node 50A of the first planetary gear set 50. A first brake 54 selectively connects the third node 52C of the second planetary gear set 52 and the third node 50C of the first planetary gear set 50 with a stationary element or the transmission housing 16. A second brake 56 selectively connects the first node 50A of the first planetary gear set 50 with the stationary element or transmission housing 16.

With reference to FIG. 2B, an alternate input splitting device arrangement 23B is shown. The input splitting device 23B is similar to that shown in FIG. 2A and therefore like components are indicated by like reference numbers. However, in FIG. 2B, the split input clutch 44 is relocated and selectively connects the second node 42B of the second gear 42 with the transmission input shaft 20. Thus, the first node 40A of the gear 40 is directly connected to the first node 50A of the first planetary gear set 50.

With reference to FIG. 2C, an alternate input splitting device arrangement 23C is shown. The input splitting device 23C is similar to that shown in FIG. 2A and therefore like components are indicated by like reference numbers. However, in FIG. 2C, the split input clutch 44 is relocated and selectively connects the second node 40B of the gear 40 with the first node 42A of the gear 42. Thus, the first node 40A of the gear 40 is directly connected to the first node 50A of the first planetary gear set 50.

Figure 3:
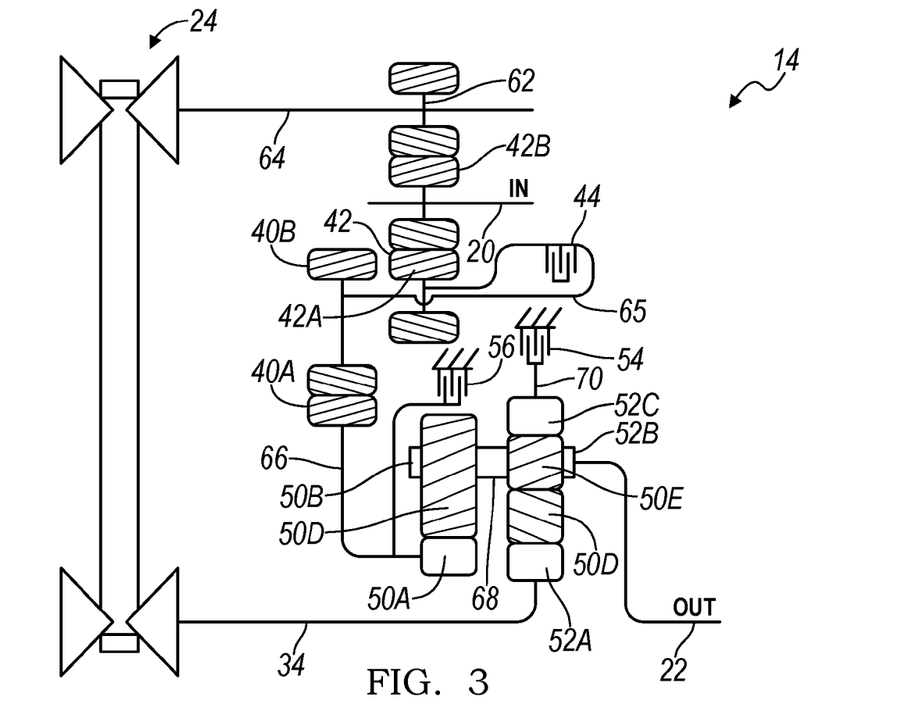
FIG. 3 is a diagrammatic illustration of an embodiment of a transmission according to the principles of the present invention.

Turning now to FIG. 3, a stick diagram presents a schematic layout of an embodiment of the transmission 14 according to the present invention. In FIG. 3 the numbering from the lever diagram of FIG. 2A-C is carried over. The clutches and couplings are correspondingly presented whereas the nodes of the planetary gear sets now appear as components of planetary gear sets such as sun gears, ring gears, planet gears and planet gear carriers.

For example, the transmission input shaft 20 is connected to a first gear 42B of the second gear set 42. The first gear 42B is in mesh with a transfer gear 62 and a second gear 42A of the second gear set 42. The transfer gear 62 is coupled to the pulley assembly 24 either directly or via an intermediate shaft or member 64. The split input clutch 44 selectively connects the gear 42A of the second gear set 40 with the first gear set 40 via an intermediate shaft or member 65. The intermediate shaft or member 65 is connected with a gear 40B of the first gear set 40. The gear 40B is in mesh with a gear 40A of the first gear set 40. The gear 40A is splined to or otherwise in mesh with a first interconnecting shaft or member 66.

The planetary gear set 50 includes a sun gear member 50A and a carrier member 50B. The ring gear member 50C is optional and not shown. The planet carrier member 50B rotatably supports a set of planet gears 50D (only one of which is shown). The planet gears 50D are each configured to intermesh with the sun gear member 50A. The sun gear member 50A is connected for common rotation with a first shaft or interconnecting member 60. The sun gear member 52A is connected for common rotation with the first shaft or interconnecting member 66. The planet carrier member 50B is connected for common rotation with a second shaft or interconnecting member 68 and the transmission output shaft 22. Alternatively the planet carrier member 50B may be integrally formed with the planet carrier 52B of the planetary gear set 52 forming a common planet carrier.

The planetary gear set 52 includes a sun gear member 52A, a planet carrier member 52B, and a ring gear member 52C. The planet carrier member 52B rotatably supports a set of planet gears 52D (only one of which is shown) and 52E (only one of which is shown). The planet gears 50D are each configured to intermesh with the sun gear member 52A and the planet gears 52E while the planet gears 52E each intermesh with the ring gear member 52C. The sun gear member 52A is connected for common rotation with the transfer member 34. The planet carrier member 52B is connected for common rotation with the transmission output shaft 22 and the second shaft or member 68. The ring gear member 52C is connected for common rotation with a third shaft or interconnecting member 70.

The torque-transmitting mechanisms or brakes 54, 56 allow for selective interconnection of the shafts or interconnecting members, members of the planetary gear sets and the housing. The torque-transmitting mechanisms are friction, dog or synchronizer type mechanisms or the like. For example, the first brake 54 is selectively engageable to connect the third shaft or interconnecting member 70 with the transmission housing 16 in order to restrict relative rotation of the member 70 and therefore the ring gear member 52C. The second brake 56 is selectively engageable to connect the first shaft or interconnecting member 66 with the transmission housing 16 in order to restrict relative rotation of the member 66 and therefore the sun gear member 50A.

During low gear states or a first set of speed ratios between the transmission input member 20 and the transmission output member 22, for example gear states used in the lowest gear speeds corresponding to step gear ratios such as Reverse, first, second, third, fourth, etc., the slit input clutch 44 is not engaged. Therefore, the torque from the engine 12 follows a path through the pulley assembly 24 and through the gearbox 26. Engagement of the brake 54 provides a Reverse gear ratio while engagement of the brake 56 provides forward gear ratios in the low gear states. During high gear states or a second set of speed ratios between the transmission input member 20 and the transmission output member 22, for example gear states used in the highest speeds corresponding to step gear ratios such as fifth, sixth, seventh, etc., the split input clutch 44 is engaged. The high gear state may be alternately defined as a range of speeds that gives the engine 12 the minimum mechanical advantage over the final drive unit 28 or wheels of the motor vehicle. Therefore torque from the engine 12 follows two split paths: one through the pulley assembly 24 to the gearbox 26 and another through the split input clutch 44 directly to sun gear 50A of the gearbox 26. Engaging the split input clutch 44 reduces the torque through the pulley assembly 24 by approximately 45% to approximately 65%, thus reducing the clamping pressure required on the belt 36 and therefore improving the efficiency of the powertrain 12 during a high gear state.

Figure 4A:
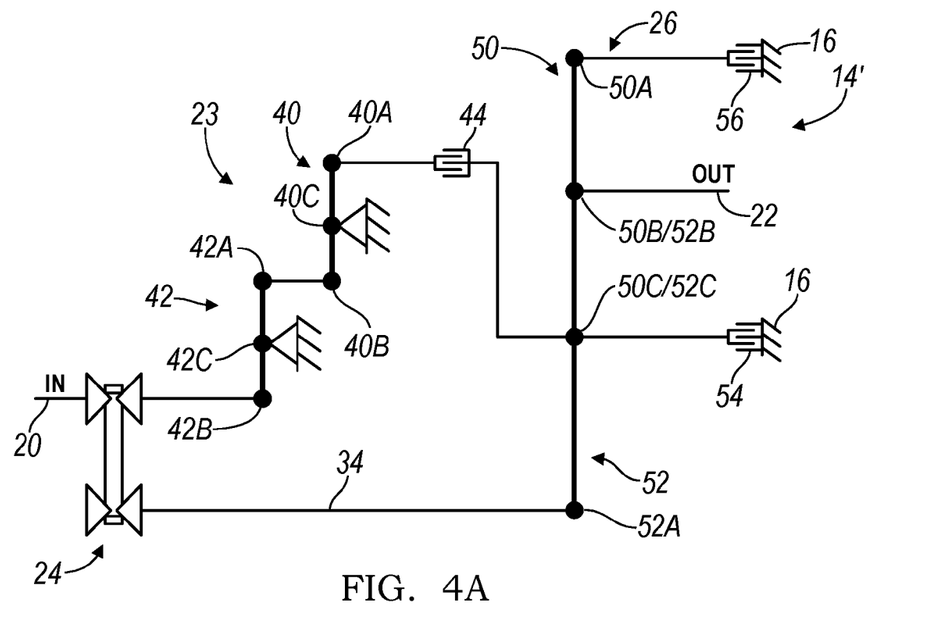
FIG. 4A is a schematic lever diagram of an exemplary transmission according to the principles of the present invention.

Turning now to FIG. 4A, an alternate transmission 14' is shown. The transmission 14' includes many of the same components as the transmission 14 shown in FIGS. 2A-C, 3 and therefore like components are indicated by like reference numbers. However, in the transmission 14', the split input torque path from the torque splitting device 23 connects to the third node 50C of the first planetary gear set 50 and the third node 52C of the second planetary gear set 52. Thus, the splint input clutch 44 selectively connects the first node 40A of the gear 40 to the third node 50C of the first planetary gear set 50 and the third node 52C of the second planetary gear set 52.

Figure 4B:
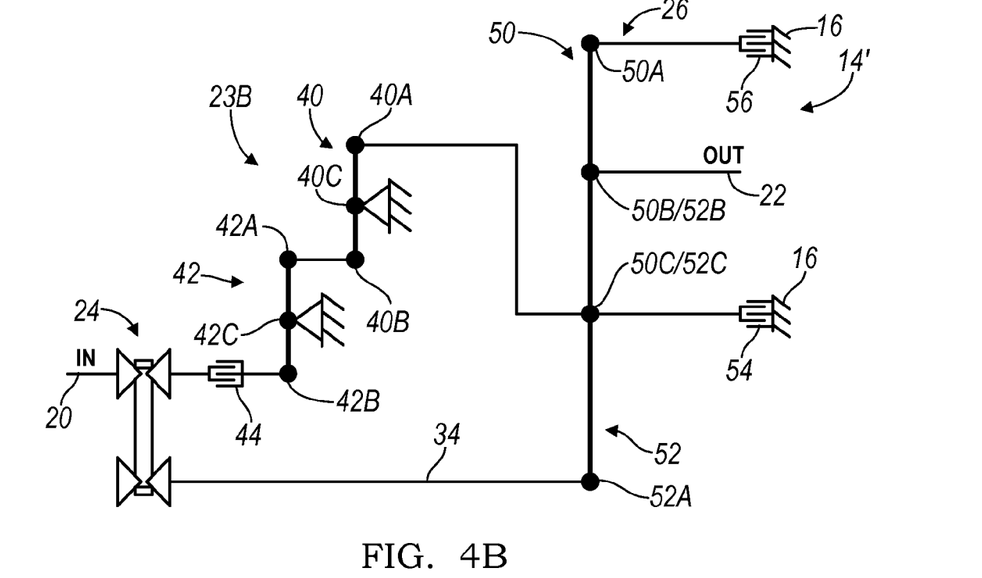
FIG. 4B is a schematic lever diagram of another exemplary transmission according to the principles of the present invention.

With reference to FIG. 4B, the alternate input splitting device arrangement 23B is shown in the arrangement of transmission 14'. The split input clutch 44 is relocated and selectively connects the second node 42B of the second gear 42 with the transmission input shaft 20. Thus, the first node 40A of the gear 40 is directly connected to the third node 50C of the first planetary gear set 50 and the third node 52C of the second planetary gear set 52.

Figure 4C:
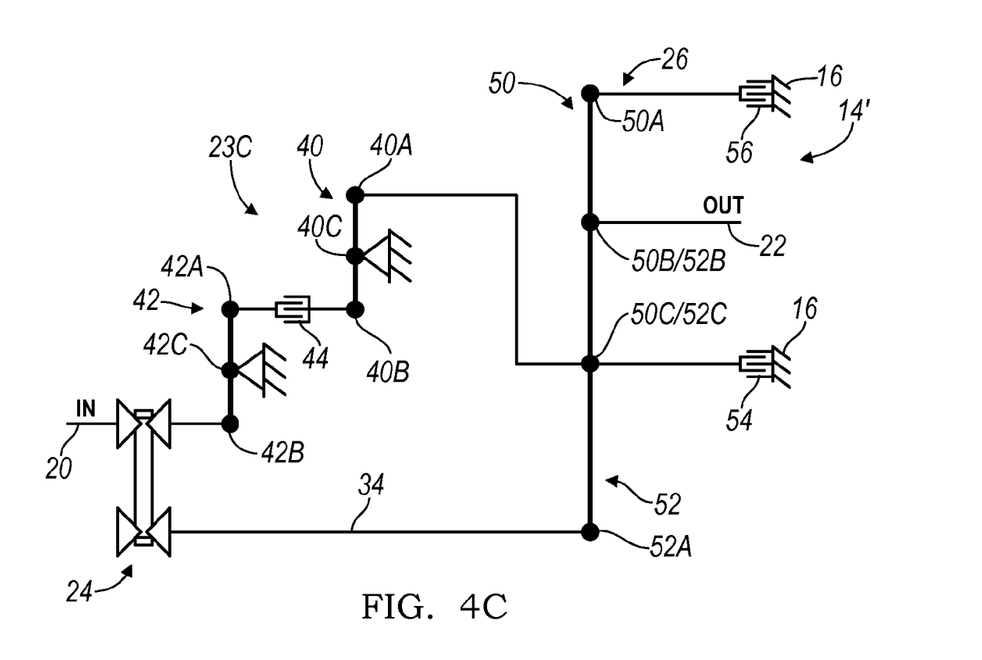
FIG. 4C is a schematic lever diagram of another exemplary transmission according to the principles of the present invention.

With reference to FIG. 4C, the alternate input splitting device arrangement 23C is shown in the arrangement of transmission 14'. The split input clutch 44 is relocated and selectively connects the second node 40B of the gear 40 with the first node 42A of the gear 42. Thus, the first node 40A of the gear 40 is directly connected to the third node 50C of the first planetary gear set 50 and the third node 52C of the second planetary gear set 52.

Figure 5:
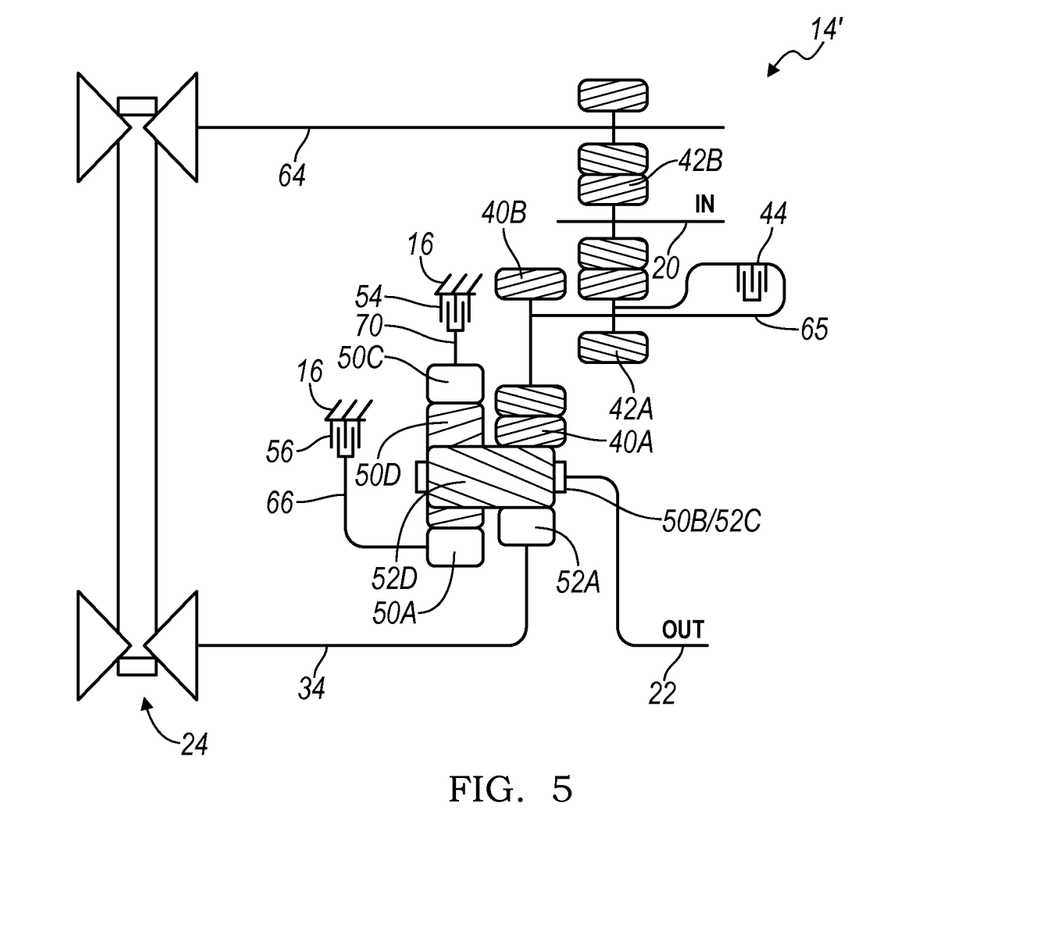
FIG. 5 is a diagrammatic illustration of an embodiment of a transmission according to the principles of the present invention.

Turning now to FIG. 5, a stick diagram presents a schematic layout of an embodiment of the transmission 14' according to the present invention. In FIG. 3 the numbering from the lever diagram of FIG. 4A-C is carried over. The clutches and couplings are correspondingly presented whereas the nodes of the planetary gear sets now appear as components of planetary gear sets such as sun gears, ring gears, planet gears and planet gear carriers.

For example, the transmission input shaft 20 is connected to a first gear 42B of the second gear set 42. The first gear 42B is in mesh with a transfer gear 62 and a second gear 42A of the second gear set 42. The transfer gear 62 is coupled to the pulley assembly 24 either directly or via an intermediate shaft or member 64. The split input clutch 44 selectively connects the gear 42A of the second gear set 40 with the first gear set 40 via an intermediate shaft or member 65. The intermediate shaft or member 65 is connected with a gear 40B of the first gear set 40. The gear 40B is in mesh with a gear 40A of the first gear set 40.

The gear sets 50 and 52 include a common planet carrier member 50B/52B, a ring gear member 50C, a sun gear member 50A, and a sun gear member 52A. The ring gear member 52C is optional or may be considered integrally formed with the gear 40A of the first gear set 40. The common planet carrier member 50B/52B rotatably supports a set of planet gears 50D (only one of which is shown) and 52D (only one of which is shown). The planet gears 50D are each configured to intermesh with both the sun gear member 50A and the ring gear member 50C. The planet gears 50D are long pinions each configured to intermesh with both the pinions 50D and the sun gear member 52A and the gear 40A of the first gear set 40. The sun gear member 50A is connected for common rotations with a first shaft or interconnecting member 66. The sun gear member 52A is connected for common rotation with the transfer member 34. The common planet carrier member 50B/52B is connected for common rotation with the transmission output shaft 22. The ring gear member 50C is connected for common rotation with a shaft or interconnecting member 70.

The torque-transmitting mechanisms or brakes 54, 56 allow for selective interconnection of the shafts or interconnecting members, members of the planetary gear sets and the housing. The torque-transmitting mechanisms are friction, dog or synchronizer type mechanisms or the like. For example, the first brake 54 is selectively engageable to connect the shaft or interconnecting member 70 with the transmission housing 16 in order to restrict relative rotation of the member 70 and therefore the ring gear member 50C. The second brake 56 is selectively engageable to connect the first shaft or interconnecting member 66 with the transmission housing 16 in order to restrict relative rotation of the member 66 and therefore the sun gear member 50A.

During low gear states, for example gear states used in the lowest gear speeds corresponding to step gear ratios such as Reverse, first, second, third, fourth, etc., the slit input clutch 44 is not engaged. Therefore, the torque from the engine 12 follows a path through the pulley assembly 24 and through the sun gear 52A of the gearbox 26. Engagement of the brake 54 provides a Reverse gear ratio while engagement of the brake 56 provides forward gear ratios in the low gear states. During high gear states, for example gear states used in the highest speeds corresponding to step gear ratios such as fifth, sixth, seventh, etc., the split input clutch 44 is engaged. The high gear state may be further defined as a range of speeds that gives the engine 12 the minimum mechanical advantage over the final drive unit 28 or wheels of the motor vehicle. Therefore torque from the engine 12 follows two split paths—one through the pulley assembly 24 to the sun gear 52A of the gearbox 26 and another through the split input clutch 44 directly to pinions 52D of the gearbox 26 (i.e.

through a ring gear of the gearbox 26). Engaging the split input clutch 44 reduces the torque through the pulley assembly 24 by approximately 45% to approximately 65%, thus reducing the clamping pressure required on the belt 36 and therefore improving the efficiency of the powertrain 12 during a high gear state.

The description of the invention is merely exemplary in nature and variations that do not depart from the gist of the invention are intended to be within the scope of the invention. Such variations are not to be regarded as a departure from the spirit and scope of the invention.

The following is claimed:

1. A continuously variable transmission comprising:
   an input member;
   an output member;
   a first gear set having a drive gear intermeshed with two driven gears, wherein the drive gear is connected to the input member;
   a second gear set;
   a continuously variable unit connected to a first of the two driven gears of the first gear set;
   a gearbox connected to the continuously variable unit, the second gear set, and to the output member; and
   a split input clutch connected between a second of the two driven gears of the first gear set and the second gear set for selectively connecting the input member with the gearbox during high gear speeds.

2. The continuously variable transmission of claim 1 wherein the split input clutch is not engaged during low gear speeds.

3. The continuously variable transmission of claim 1 wherein the gearbox includes a first planetary gear set interconnected to a second planetary gear set.

4. The continuously variable transmission of claim 3 wherein the first planetary gear set includes a first member and a second member and the second planetary gear set includes a first member, a second member, and a third member, wherein the third member of the second planetary gear set is connected to a first brake, the first member of the first planetary gear set is connected to the second pear set and is connected to a second brake, the first member of the second planetary gear set is connected to the continuously variable unit, and the second members of the first and second planetary gear sets are interconnected to the output member.

5. The continuously variable transmission of claim 4 wherein the first members are sun gears, the second members are planet carrier members, and the third member is a ring gear.

6. The continuously variable transmission of claim 1 wherein the continuously variable unit includes an endless belt disposed between two movable pulleys.

7. The continuously variable transmission of claim 1 wherein the second gear set includes a drive gear intermeshed with a driven gear, and the drive gear of the second gear set is connected to the split input clutch and the driven gear of the second gear set is connected to the gearbox.

8. A continuously variable transmission comprising:
   an input member;
   an output member;
   a first gear set having a drive gear intermeshed with two driven gears, wherein the drive gear is connected to the input member;
   a second gear set;
   a continuously variable unit connected to a first of the two driven gears of the first gear set;
   a first planetary gear set having a first member and a second member, wherein the first member is connected to the second gear set and is selectively braked;
   a second planetary gear set having a first member, a second member, and a third member, wherein the first member of the second planetary gear set is connected to the continuously variable unit, the second member is connected to the second member of the second planetary gear set of the first planetary gear set and the output member, and the third member is selectively braked; and
   a split input clutch connected between a second of the two driven gears of the first gear set and the second gear set.

* * * * *